(12) United States Patent
Lim

(10) Patent No.: US 8,922,359 B2
(45) Date of Patent: Dec. 30, 2014

(54) TIRE LOCATION INFORMATION TRANSMITTING APPARATUS AND METHOD

(71) Applicant: Hyundai Mobis Co., Ltd., Seoul (KR)

(72) Inventor: Ji Hyung Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/756,563

(22) Filed: Feb. 1, 2013

(65) Prior Publication Data

US 2014/0043153 A1    Feb. 13, 2014

(30) Foreign Application Priority Data

Jun. 11, 2012  (KR) .................. 10-2012-0062180

(51) Int. Cl.
  *B60C 23/00*  (2006.01)
  *B60C 23/04*  (2006.01)

(52) U.S. Cl.
  CPC ......... *B60C 23/0489* (2013.01); *B60C 23/0416* (2013.01); *B60C 23/0486* (2013.01)
  USPC .......................... 340/447; 340/444; 340/686.1

(58) Field of Classification Search
  USPC ................. 340/447, 442, 444, 686.1; 73/146, 73/146.5; 701/49, 31.1, 29.1, 30.9, 498
  See application file for complete search history.

(56) References Cited

U.S. PATENT DOCUMENTS

| | | | |
|---|---|---|---|
| 7,392,119 B2 * | 6/2008 | Allard et al. ................. | 701/33.9 |
| 8,217,776 B2 * | 7/2012 | Hyde ............................. | 340/442 |
| 8,498,785 B2 * | 7/2013 | Juzswik et al. ................ | 701/49 |

FOREIGN PATENT DOCUMENTS

| | | |
|---|---|---|
| JP | 2005-157416 | 6/2005 |
| KR | 10-2011-0004655 | 1/2011 |
| KR | 10-2011-0126758 A | 11/2011 |

* cited by examiner

*Primary Examiner* — Toan N Pham
(74) *Attorney, Agent, or Firm* — NSIP Law

(57) ABSTRACT

Provided are an apparatus and method for transmitting information on a location of a tire with information on pressure of the tire. The present disclosure provides logic for calculating rotation angles among a plurality of magnetic field samples obtained from a geomagnetic sensor, calculating rotational directions, and determining the left/right locations of the tire on the basis of the number of times of accumulation of the rotational directions.

15 Claims, 6 Drawing Sheets

TIRE LOCATION INFORMATION TRANSMITTING APPARATUS AND METHOD

CROSS-REFERENCE TO RELATED APPLICATIONS

This application claims priority under 35 U.S.C. §119 to Korean Patent Application No. 10-2012-0062180, filed on Jun. 11, 2012, the disclosure of which is incorporated herein by reference in its entirety.

TECHNICAL FIELD

The present disclosure relates to a tire pressure monitoring system for detecting pressure of a tire to show the detected pressure or indicate a location of a tire of which pressure is low to a driver, and in particular, relates to an apparatus and method for determining whether a tire is located at the left or right of a vehicle on the basis of information detected by a geomagnetic sensor of a tire pressure monitoring system and for transmitting the tire location information.

BACKGROUND

A Tire Pressure Monitoring System (TPMS) is used for detecting pressure of a tire and maintaining the pressure at an appropriate level. The TPMS includes a sensor and a control device. The sensor installed in a tire detects pressure of the tire and transmits, to the control device installed in a vehicle, a sensing value and a unique ID of the sensor by using an RF module. The control device receives, from the sensor, RF data and vehicle information to determine a state of each tire and a state of a receiver and to transmit, to a display device recognizable by a driver, information to be displayed.

The TPMS may be classified into a high end system and a low end system according to a display method for a driver. The high end system displays pressure of each tire or displays a location of a tire of which pressure is low to a driver. The low end system just displays a warning message to a driver when even one of tires of a vehicle has low pressure.

To implement the high end system, information on a location of a sensor installed in each tire should be transmitted from the sensor, and an installation location of the sensor should be determined by using information utilizable by a control device.

U.S. Pat. No. 7,010,968 (Schrader) discloses one of TPMSs according to the related art. According to this system, Z/X-axis accelerometers are installed in left and right tires, and by using a principle in which Z/X-axis accelerometer signals of the left and right positions have different phases, the left and right positions are distinguished from each other. Further, by using a principle in which strength of an RF signal of a sensor, which is detected by a control device, is inversely proportional to the square of a distance to the sensor, the front and rear positions are distinguished from each other.

According to this system, a dual-axis accelerometer for distinguishing the left and right positions is needed, thereby requiring more space and increasing cost. Further, the speed of a vehicle and flatness of a road are limited in order to detect a phase difference between signals. Moreover, the control device for distinguishing the front and rear positions is required to be installed in such a location that the strength of the RF signal of the sensor is not reduced due to a chassis or electronic device of a vehicle or a driver. Therefore, this device is installed in a limited location such as a bumper, which requires additional wires and a waterproof function, causing an increase in cost and a limitation in space.

To overcome these limitations, it has been proposed that a function for detecting operation information (rotation speed) of a tire is added to a sensor in order to determine a location by comparing the operation information with wheel speed sensor information used for a chassis controller (ABS/ESC). According to this proposal, a Z-axis accelerometer is installed in the sensor in order to detect a wheel speed on the basis of a period of a signal of the accelerometer by using a phenomenon in which the signal of the accelerometer is outputted as a sine wave according to rotation of a wheel. Then, data on the wheel speed are transmitted to a control device by using an RF module, and the control device compares each wheel speed detected by a wheel speed sensor used for the chassis controller (ABS/ESC) with the received wheel speed so as to determine the location.

However, according to this proposal, as shown from the strength of the signal of the Z-axis accelerometer, a wheel speed offset occurs in the Z-axis accelerometer according to the rotation speed of a wheel. Therefore, in the case of high-speed rotation, due to a relatively great offset in comparison with the sine wave of the signal, it is difficult to detect the period of the sine wave. Further, an additional circuit for detecting the period of the sine wave is needed.

SUMMARY

Accordingly, the present disclosure provides a tire location information transmitting apparatus and method for measuring rotation angles of continuous samples on the basis of magnetic field sample information detected by a geomagnetic sensor, and determining and transmitting a location of a tire on the basis of degrees or directions of the rotation angles.

In one general aspect, a tire location information transmitting apparatus includes: a geomagnetic sensor located in a tire of a vehicle to detect a magnetic field; and a control unit receiving information on samples of the magnetic field detected by the geomagnetic sensor and performing a logic operation for determining a location of the tire, wherein, in the location determining logic operation, a rotation angle between the samples is calculated, and the location of the tire is determined by using at least one of a value of the rotation angle and a rotational direction.

The control unit may determine that the location of the tire is the left when the rotational direction is counter clockwise and may determine that the location of the tire is the right when the rotational direction is clockwise. The control unit may measure the number of times of cases where the rotational direction is counter clockwise and the number of times of cases where the rotational direction is clockwise, may determine whether the numbers of times are equal to or greater than a critical value, and may determine the location of the tire.

The control unit may determine that the location of the tire is the left when the rotation angle is positive and may determine that the location of the tire is the right when the rotation angle is negative.

In another general aspect, a tire location information transmitting method includes: periodically determining whether a vehicle is being driven on the basis of samples of a geomagnetic sensor; obtaining a plurality of continuous sensor samples from the geomagnetic sensor at regular intervals when it is determined that the vehicle is being driven; calculating center points of the samples on the basis of the obtained sensor samples; calculating rotation angles of the samples with respect to the center points; determining a location of a tire of the vehicle on the basis of directions of the rotation angles; and transmitting information on the location of the tire to a receiving device.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
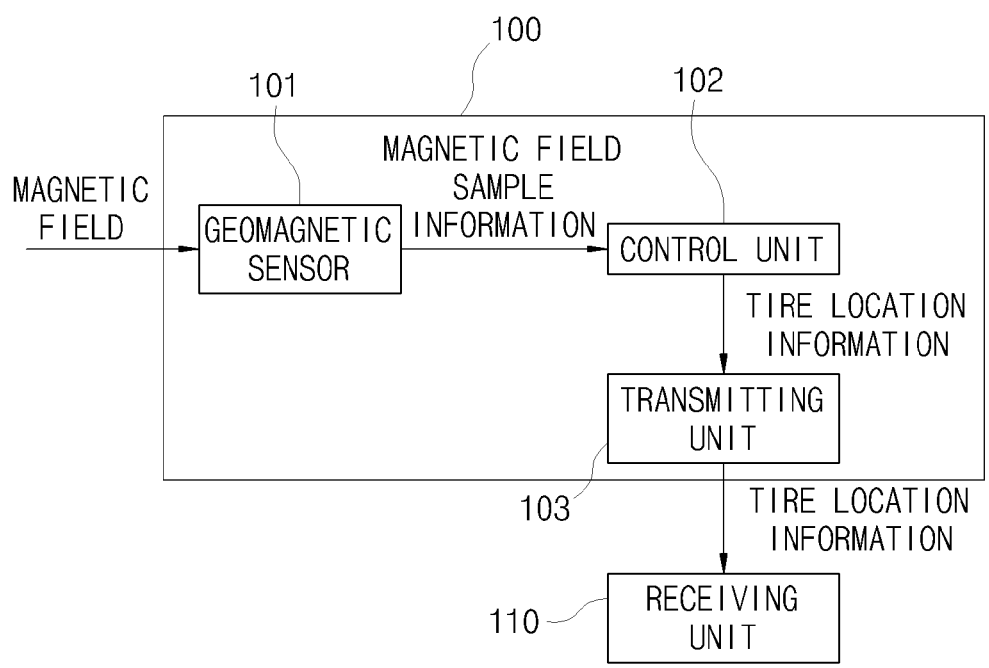
FIG. 1 is a block diagram illustrating a tire location information transmitting apparatus according to an exemplary embodiment.

FIG. 1 is a block diagram illustrating a tire location information transmitting apparatus according to an exemplary embodiment.

A tire location information transmitting apparatus 100 includes a geomagnetic sensor 101, a control unit 102, and a transmitting unit 103.

The geomagnetic sensor 101, which detects the magnetic field of the earth to detect direction information such as the north, south, east, and west like a compass, detects a location of the sensor by detecting the magnetic field of the earth. In the geomagnetic sensor 101, a driving direction of a vehicle is set as an X-axis and a direction to the sky is set as a Z-axis. When a tire rotates according to driving of the vehicle, an installation angle of the sensor is changed, and sample information for each location of the sensor is generated.

The geomagnetic sensor 101 transmits the generated pieces of magnetic field sample information to the control unit 102.

The control unit 102 receives the magnetic field sample information from the geomagnetic sensor 101 and performs a logic operation for determining a location of a tire on the basis of the information.

The control unit 102 may determine whether the vehicle is being driven so that the tire location determining logic operation is performed only when the vehicle is being driven.

To determine whether the vehicle is being driven, the control unit 102 receives, from the geomagnetic sensor 101, continuous two pieces of the magnetic field sample information at regular intervals. When a distance between the two magnetic field samples is sufficiently small, it is considered that the vehicle is stopped. Thus, the tire location determining logic operation is not performed.

Therefore, only when the distance between the two magnetic field samples that are periodically received is sufficiently small, the tire location determining logic operation is performed.

Figure 2:
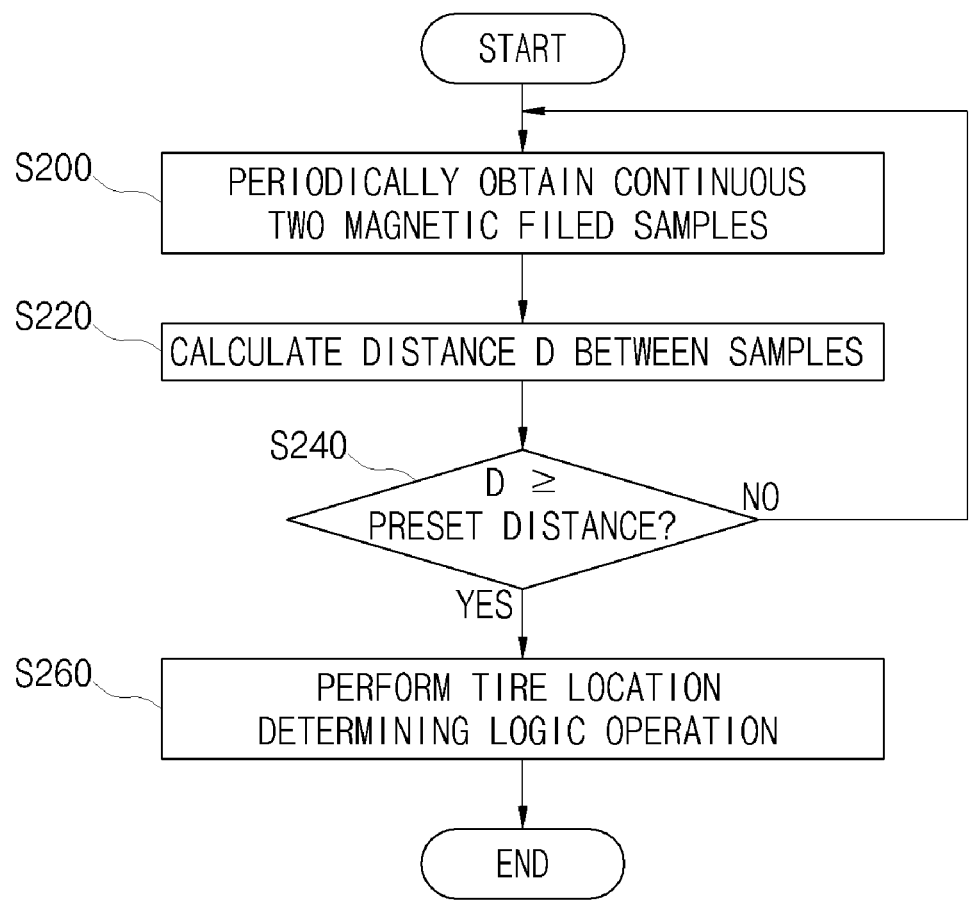
FIG. 2 is a flowchart illustrating a process of checking a driving state of a vehicle according to a tire location information transmitting method according to an exemplary embodiment.

FIG. 2 is a flowchart illustrating operations performed by the control unit 102 to determine whether the vehicle is being driven and thereby determine whether to perform the tire location determining logic operation.

Continuous two magnetic field samples are periodically (e.g., every 20 seconds) obtained in operation S200, and a distance D between the obtained two samples is calculated in operation S220. It is determined whether the distance D is equal to or greater than a preset distance in operation S240. When the distance D is smaller than the preset distance, the vehicle is considered to be stopped. Thus, the tire location determining logic operation is not performed, and the operation for periodically obtaining samples is repeated. When the distance D is equal to or greater than the preset distance, the vehicle is considered to be being driven, and thus the tire location determining logic operation is performed in operation S260.

Figure 3A:
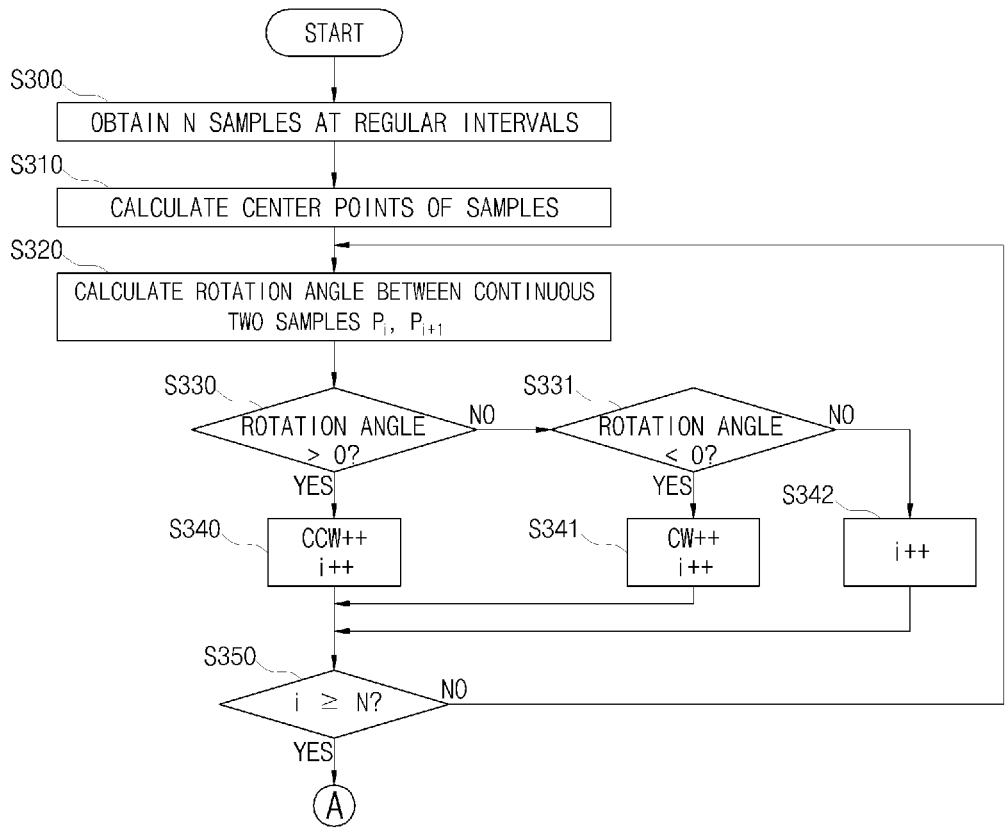
FIGS. 3A and 3B include a flowchart illustrating a process of determining a location of a tire according to a tire location information transmitting method according to an exemplary embodiment.
Figure 3B:
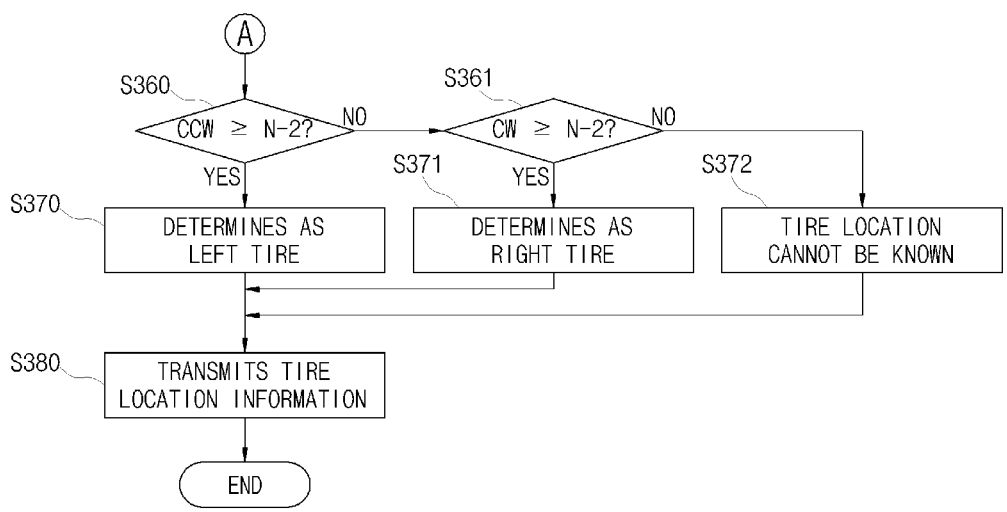

FIGS. 3A and 3B include a flowchart illustrating the tire location determining logic operation performed by the control unit 102.

When it is determined that the vehicle is being driven, continuous N pieces of the magnetic field sample information are received from the geomagnetic sensor 101 at regular intervals to determine a tire location in operation S300. A time interval between the pieces of the magnetic field sample information is determined according to a speed of the vehicle.

Figure 4:
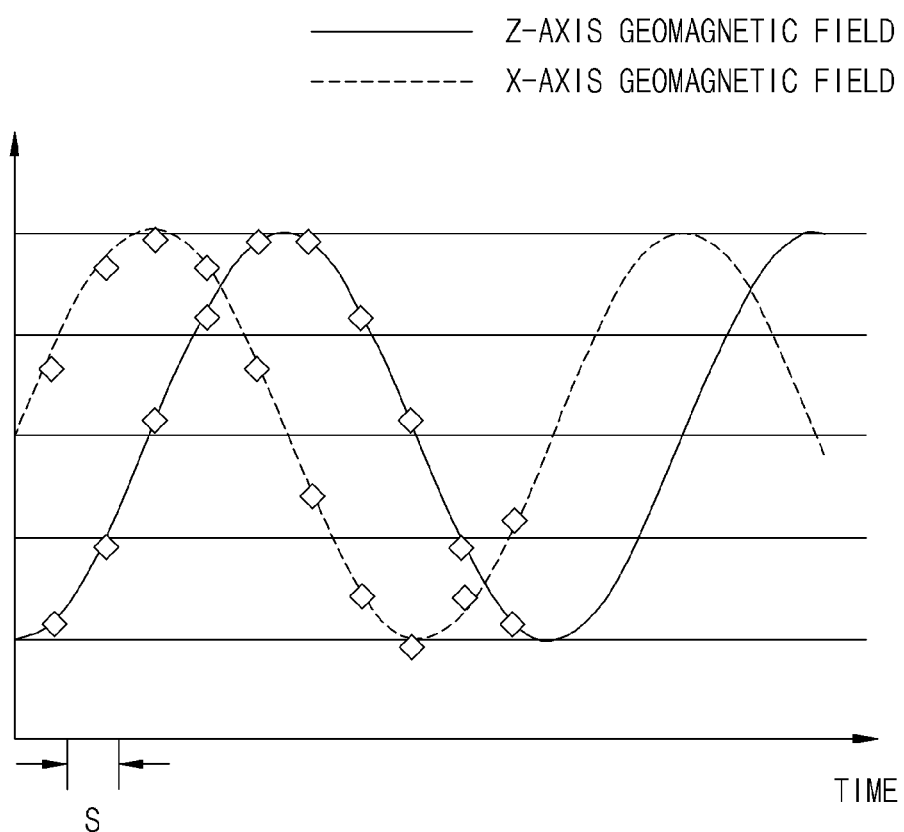
FIG. 4 is a diagram illustrating a process of sampling of geomagnetic sensor information for obtaining location information on a tire according to a tire location information transmitting method according to an exemplary embodiment.

FIG. 4 illustrates that the magnetic field samples are obtained every certain period of time (S).

When the control unit 102 receives the N continuous pieces of the magnetic field sample information, center points of the samples are calculated in operation S310.

Figure 5A:
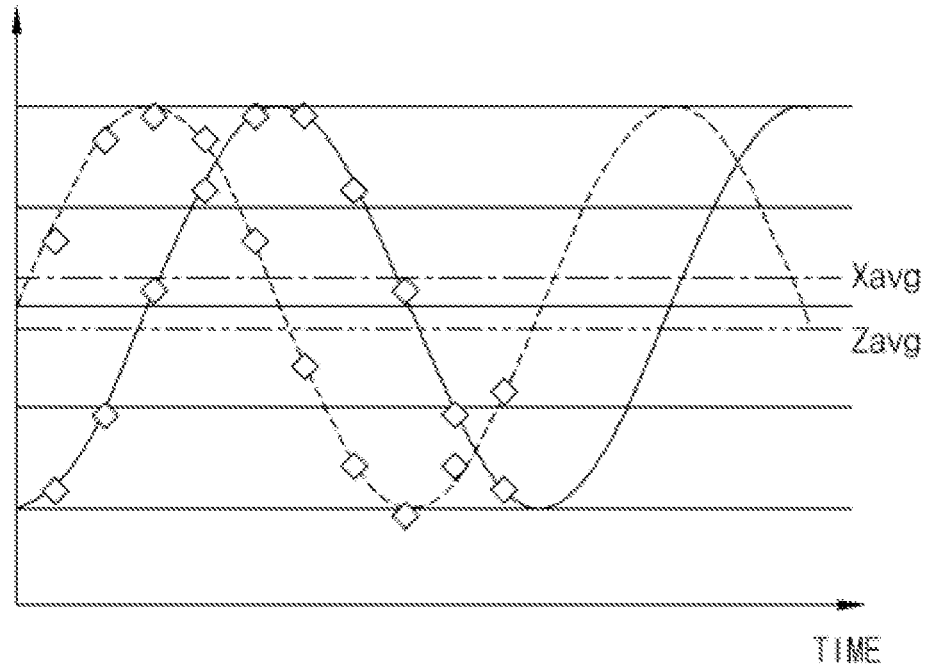
FIGS. 5A and 5B are diagrams illustrating a process of calculating of center points of geomagnetic sensor samples according to a tire location information transmitting method according to an exemplary embodiment.
Figure 5B:
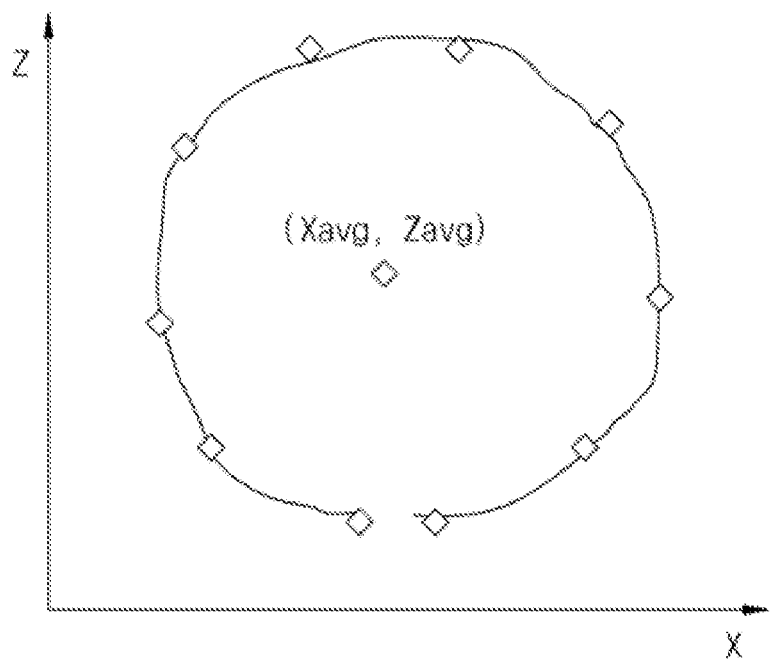

FIGS. 5A and 5B illustrate a process of calculating the center points of the samples. Since the magnetic field samples have circular shapes, the center points of the samples may be calculated by using coordinates of the samples.

Figure 6:
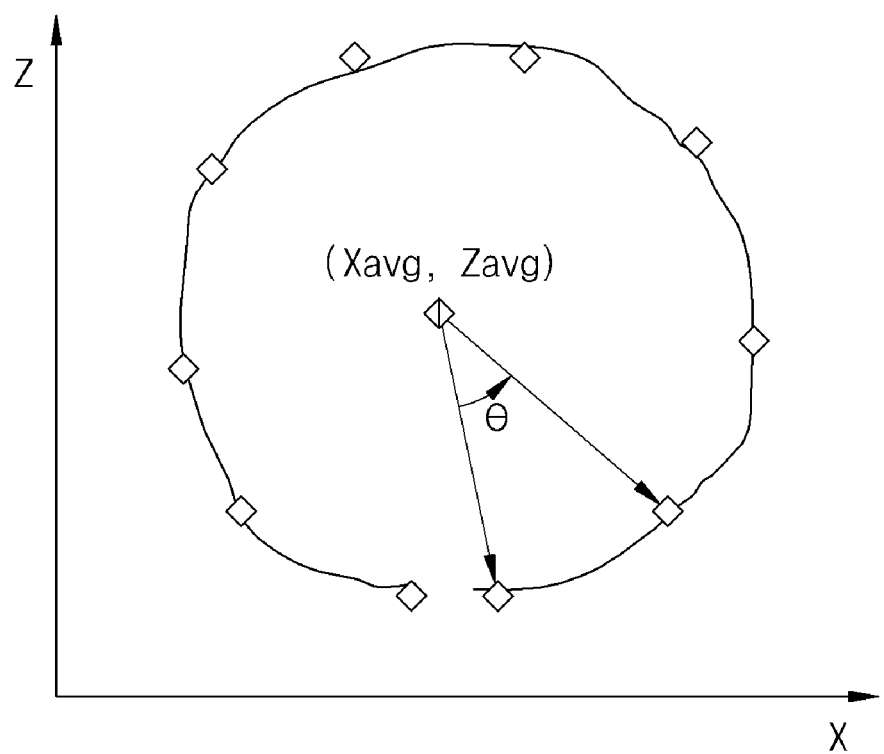
FIG. 6 is a diagram illustrating a process of calculating of rotation angles of samples according to a tire location information transmitting method according to an exemplary embodiment.

When the control unit 102 calculates the center points of the magnetic field samples, a rotation angle between continuous two samples $P_i$ and $P_{i+1}$ is calculated in operation S320. Here, an initial value of "i" is 1, and FIG. 6 illustrates the calculation of the rotation angle.

When the control unit 102 calculates the rotation angle between the continuous two samples, it is determined whether the rotation angle is greater than 0 in operation S330. When the rotation angle is greater than 0, a rotational direction is counter clockwise. Thus, a value of CCW is increased by 1, and a value of "i" is also increased by 1 in operation S340.

When the rotation angle is not greater than 0, it is determined whether the rotation angle has a smaller value than 0 in operation S331. When the rotation angle is smaller than 0, the rotational direction is clockwise. Thus, a value of CW is increased by 1, and a value of "i" is also increased by 1 in operation S341.

When the rotation angle is not greater than and is not smaller than 0, the rotation direction cannot be known. Thus, only a value of "i" is increased by 1 in operation S342.

Since rotation angles among N magnetic field samples are calculated during the tire location determining logic operation, a value of "i" is compared with that of N in operation S350 so as to repeat the calculation of the rotation angle until "i" has the value of N.

When all the rotation angles among the magnetic field samples are calculated, it is determined whether the CCW and CW are equal to or greater than a critical value in order to determine the tire location. Here, when the tire location determining logic operation is performed by using N magnetic field samples, the critical value is N−2.

Therefore, the control unit 102 determines whether the CCW is equal to or greater than N−2 in operation S360, and determines, in operation S370, that the tire location is the left of the vehicle when the CCW is equal to or greater than N−2. When the CCW is not equal to or greater than N−2, it is determined whether the CW is equal to or greater than N−2 in operation S361, and it is determined, in operation S372, that the tire location is the right of the vehicle when the CW is equal to or greater than N−2. Both of the CCW and CW are smaller than the critical value N−2, it is determined that the tire location cannot be detected in operation S372. Here, the sequences of determining whether the CCW and CW are equal to or greater than the critical value may be inversed.

Or, the control unit 102 may calculate all the rotation angles among the N samples on the basis of the magnetic field sample information to determine the tire location on the basis of the number of times of accumulation of rotational direction. However, it may also be determined that the tire location is the left when the rotation angle is positive and the tire location is the right when the rotation angle is negative. Further, the left and right locations of a tire may also be determined by detecting a rotational direction of the tire on the basis of a relation between locations of a previously measured sample and a following sample.

To improve reliability, the control unit 102 may accumulate location information determined according to the tire location determining operation for a certain period of time (e.g., 15 minutes) to finally determine the tire location.

The control unit 102 transmits, to the transmitting unit 103, the tire location information determined according to the tire location determining logic operation.

The transmitting unit 103 transmits, to a receiving device 110, the tire location information received from the control unit 102 in operation 5380. The receiving device 110 is generally used as a receiving device of a Tire Pressure Monitoring System (TPMS). The transmitting unit 103 may transmit tire pressure information with the tire location information. The TPMS may transmit, to a driver, information on a location of a tire having low pressure on the basis of the information received from the transmitting unit 103.

According to the present disclosure, the tire location determining logic operation optimized for driving of a vehicle is performed by using a geomagnetic sensor. Therefore, the left/right locations of a tire can be correctly determined even when the vehicle is driven on a tough road. Further, the number of arithmetic operations for a location determining algorithm is reduced, and power consumption is minimized. Moreover, since the number of components is reduced, a price of a TPMS can be reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A tire location information transmitting apparatus comprising:
   a geomagnetic sensor configured to be located in a tire of a vehicle, and detect a magnetic field; and
   a control unit configured to receive information on samples of the detected magnetic field,
   calculate a rotation angle between the samples, and determine a location of the tire based on at least one of a value of the rotation angle and a rotational direction.

2. The tire location information transmitting apparatus of claim 1, wherein the control unit is further configured to determines that the location of the tire is a left side of the vehicle in response to rotational direction being counter clockwise, and determines that the location of the tire is a right side of the vehicle in response to the rotational direction being clockwise.

3. The tire location information transmitting apparatus of claim 1, wherein the control unit is further configured to measures a number of times of cases where the rotational direction is counter clockwise and a number of times of cases where the rotational direction is clockwise, determines whether the numbers of times are equal to or greater than a critical value, and determines the location of the tire.

4. The tire location information transmitting apparatus of claim 1, wherein the control unit is further configured to determine that the location of the tire is a left side of the vehicle in response to the rotation angle being positive, and determine that the location of the tire is a right side of the vehicle in response to the rotation angle being negative.

5. The tire location information transmitting apparatus of claim 1, wherein the control unit is configured to calculate center points of the samples on a basis of the sample information, and calculates rotation angles of the samples with respect to the center points.

6. The tire location information transmitting apparatus of claim 1, wherein the control unit is further configured to determine that the vehicle is being driven when a distance between the samples according to the sample information is equal to or greater than a predetermined distance.

7. The tire location information transmitting apparatus of claim 6, wherein the control unit is further configured to perform a logic operation for determining the location of the tire in response to the control unit determining that the vehicle is being driven.

8. The tire location information transmitting apparatus of claim 1, wherein the control unit is further configured to periodically checks the sample information to determine whether the vehicle is being driven.

9. The tire location information transmitting apparatus of claim 1, further comprising a transmitting unit configured to transmit, to a receiving device, information on the location of the tire determined by the control unit.

10. A tire location information transmitting method comprising:
   periodically determining whether a vehicle is being driven based on samples of a geomagnetic sensor;
   obtaining a plurality of continuous sensor samples from the geomagnetic sensor at regular intervals when it is determined that the vehicle is being driven;
   calculating center points of the samples based on the obtained sensor samples;
   calculating rotation angles of the samples with respect to the center points;
   determining a location of a tire of the vehicle based on directions of the rotation angles; and
   transmitting information on the location of the tire to a receiving device.

11. The tire location information transmitting method of claim 10, wherein the calculating of rotation angles comprises recognizing counter clockwise direction of rotation in response to the rotation angles of the samples being positive, and recognizing clockwise direction of rotation in response to the rotation angles of the samples being negative.

12. The tire location information transmitting method of claim 11, wherein the determining of a location of a tire comprises determining that the location of the tire is a left side of the vehicle in response to the rotational direction being counter clockwise, and determining that the location of the tire is a right side of the vehicle in response to the rotational direction being clockwise.

13. The tire location information transmitting method of claim 11, wherein the determining of a location of a tire comprises measuring a number of times of cases where the samples rotate counter clockwise and a number of times of cases where the samples rotate clockwise, determining whether the numbers of times are equal to or greater than a critical value, and determining the location of the tire.

14. The tire location information transmitting method of claim 13, wherein the determining of a location of a tire comprises determining that the location of the tire is a left side of the vehicle in response to the number of times of the counter clockwise rotation is equal to or greater than the critical value, determining that the location of the tire is a right side of the vehicle in response to the number of times of the clockwise rotation is equal to or greater than the critical value, and determining that the location of the tire cannot be detected in response to both of the numbers of times are smaller than the critical value.

15. The tire location information transmitting method of claim 10, wherein the obtaining of a plurality of continuous sensor samples comprises determining a time interval between the samples according to a speed of the vehicle and obtaining the continuous sensor samples at the regular intervals.

* * * * *